(12) United States Patent
Iwatsuki (10) Patent No.: US 6,547,281 B1
(45) Date of Patent: Apr. 15, 2003

(54) SUSPENSION SUPPORTING MEMBER FOR VEHICLE

(75) Inventor: Shuichiro Iwatsuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/674,484

(22) PCT Filed: Apr. 28, 1999

(86) PCT No.: PCT/JP99/02287

§ 371 (c)(1),
(2), (4) Date: Nov. 8, 2000

(87) PCT Pub. No.: WO99/58391

PCT Pub. Date: Nov. 18, 1999

(30) Foreign Application Priority Data

May 11, 1998 (JP) .............................. 10-127692

(51) Int. Cl.[7] .............................................. B62D 21/00
(52) U.S. Cl. ...................................... 280/785; 280/781
(58) Field of Search ................................. 280/781, 787, 280/124.151, 124.162, FOR 169, FOR 154, 785

(56) References Cited

U.S. PATENT DOCUMENTS 2,724,600 A * 11/1955 Wagner
3,024,041 A * 3/1962 Maruhn
3,768,828 A * 10/1973 Klein
5,383,987 A 1/1995 Kreis et al. .................... 156/60
5,431,363 A 7/1995 Ezzat et al. .................. 248/205
5,456,517 A 10/1995 Kalian et al. ................ 296/194

FOREIGN PATENT DOCUMENTS

| DE | 4204825 | * 6/1993 | ................. 280/781 |
| DE | 19624242 A1 | 9/1997 | |
| JP | 63-9088 | 1/1988 | |
| JP | 1-161984 | 11/1989 | |
| JP | 10-67339 | 3/1998 | |

* cited by examiner

Primary Examiner—Eric Culbreth
(74) Attorney, Agent, or Firm—Arent Fox Kintner Plotkin & Kahn (57) ABSTRACT

A suspension support member is mounted on a vehicle body to support a coil spring and a shock absorber forming a suspension, and is formed of a cast article including a spring seat for the coil spring and a pivot support section for the shock absorber, which are disposed independently from each other. Thus, the suspension support member is provided which ensures that the supported positions of the coil spring and the shock absorber in the suspension can be determined simply with a good accuracy, and which has a high rigidity and moreover, enables the generation of noises to be inhibited remarkably.

6 Claims, 8 Drawing Sheets

SUSPENSION SUPPORTING MEMBER FOR VEHICLE

FIELD OF THE INVENTION

The present invention relates to a suspension support member for a vehicle, and particularly, to a suspension support member mounted on a vehicle body to support a coil spring and a shock absorber forming a suspension.

BACKGROUND ART

There is a conventionally known sport car having a vehicle body which is formed in a monocoque construction by welding and assembling panels made of an Al alloy together. In this case, coil springs and shock absorbers for left and right rear wheels are disposed concentrically and supported at their upper ends on cylindrical portions of left and right rear frame panel sets forming a portion of the vehicle body.

However, each of the rear frame panel sets suffers from the following problem. The rear frame panel set is formed by assembling various pressed parts made of an Al alloy by welding. Hence, the accumulation of dimensional errors of the pressed parts, a thermal strain due to the welding and the like are liable to occur. For this reason, a very large number of steps are required for ensuring a positional accuracy for the cylindrical portions.

An annular upper end wall and its vicinity of each of the cylindrical portions receiving a suspension input are formed by superposition of plates, in order to enhance the rigidity thereof. However, the plate-superposed structure is liable to become a source of generation of noises due to the vibration of the individual plate.

DISCLOSURE OF THE INVENTION

Accordingly, it is an object of the present invention to provide a suspension support member of the above-described type for a vehicle, wherein the supported positions of a coil spring and a shock absorber forming a suspension can be determined simply with a good accuracy, and the support member has a high rigidity and moreover, the generation of noises can be inhibited remarkably.

To achieve the above object, according to the present invention, there is provided a suspension support member for a vehicle, mounted on a vehicle body to support a coil spring and a shock absorber forming a suspension, wherein the suspension support member is formed of a cast article including a spring seat for the coil spring and a pivot support section for the shock absorber, the spring seat and the pivot support section being disposed independently from each other.

With the above arrangement, the suspension support member is formed of the cast article and hence, the positions of the spring seat for the coil spring and the pivot support section for the shock absorber in the member are not moved. Therefore, if the suspension support member is disposed in a predetermined position on the vehicle body, the supported positions of the coil spring and the shock absorber can be determined simply with a good accuracy. In addition, the suspension support member made by casting has a high rigidity and moreover, has a vibration-damping property, whereby the generation of noises can be inhibited remarkably. Further, since the spring seat and the pivot support section are disposed independently from each other, the dispersion of a suspension input is provided. This is effective for ensuring the rigidity of the suspension support member and for enhancing the durability of the suspension support member.

BEST MODE FOR CARRYING OUT THE INVENTION

Figure 1:
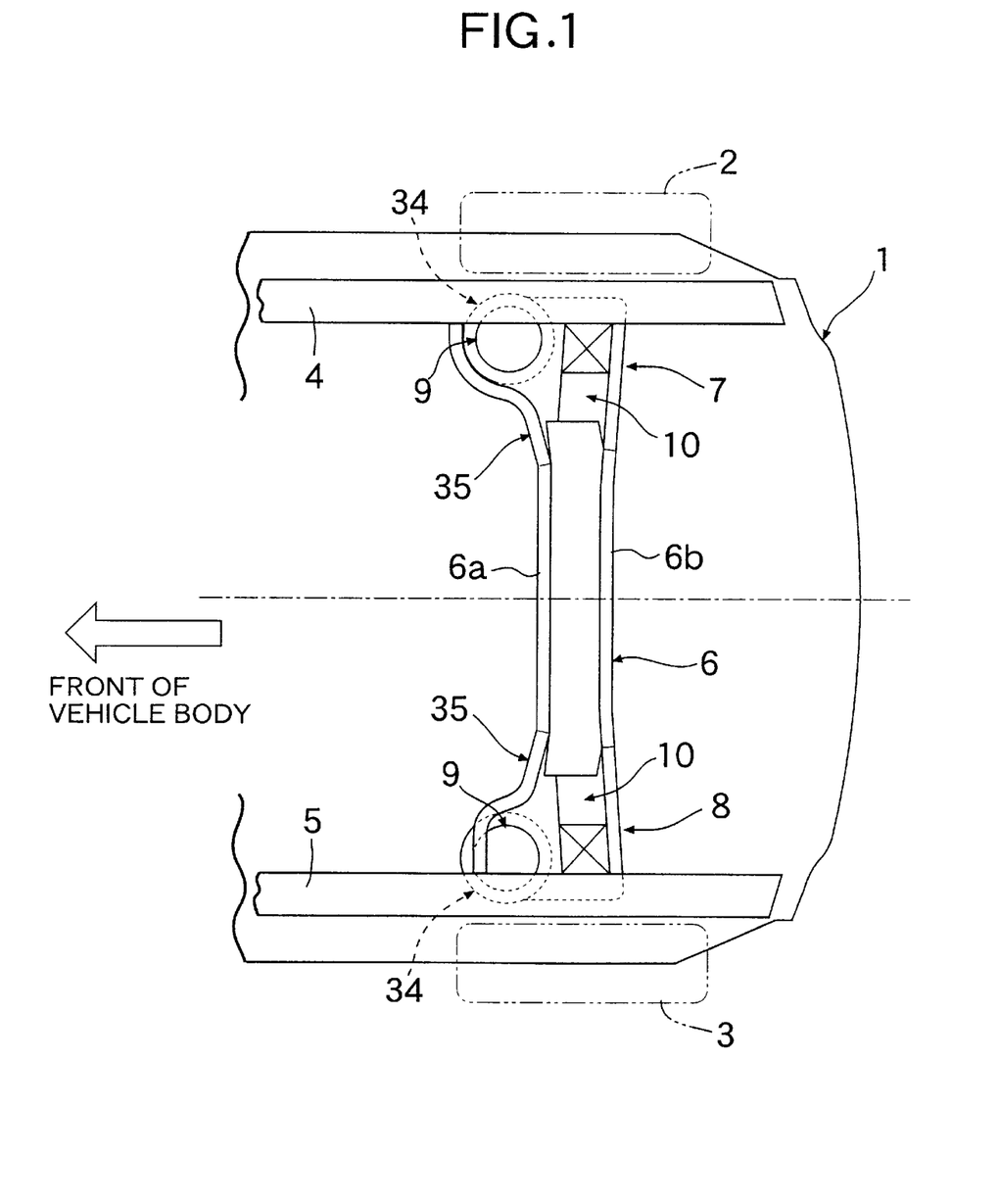
FIG. 1 is a schematic plan view showing a rear portion of a vehicle body.

FIG. 1 shows a rear section of a vehicle body 1 for a sport car, of which predetermined portion is formed from an Al alloy. The vehicle body 1 includes left and right side members 4 and 5 made of an Al alloy and disposed at left and right rear wheels (vehicle wheels) 2 and 3, and a rear cross member 6 made of an Al alloy and disposed between both the side members 4 and 5. The side members 4 and 5 are connected to the rear cross member 6 by left and right suspension support members 7 and 8 made of an Al alloy, respectively. Each of the left and right side members 4 and 5 is of a substantially rectangular pipe-shape, and the rear cross member 6 is of a channel-shape including floor panel mounting portions 6a and 6b of a band shape at front and rear portions thereof.

Figure 2:
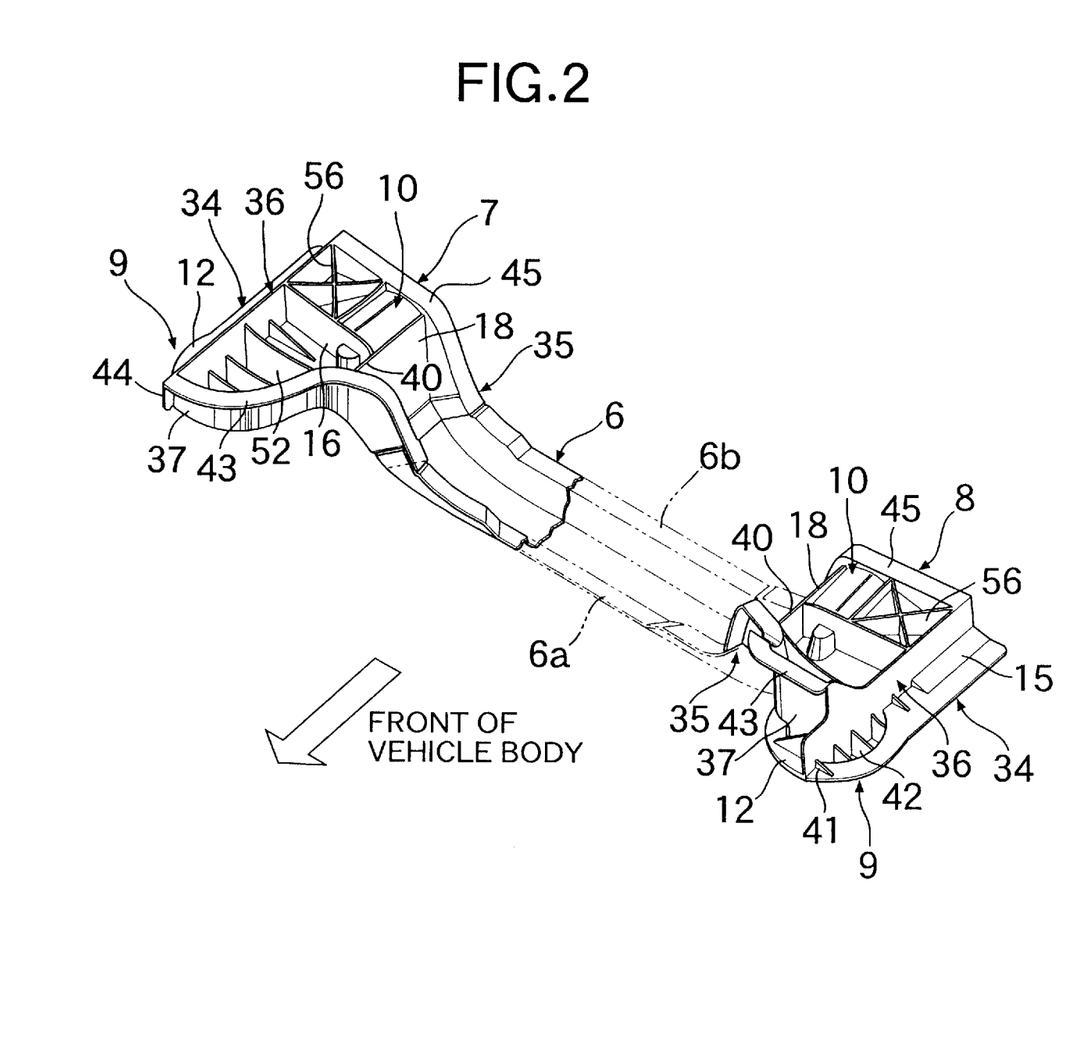
FIG. 2 is a perspective view showing the relationship between left and right suspension support members and a rear cross member.

As also shown in FIG. 2, the left and right suspension support members 7 and 8 are formed of cast articles having substantially the same structure and hence, the right suspension support member 7 will be described below.

Figure 3:
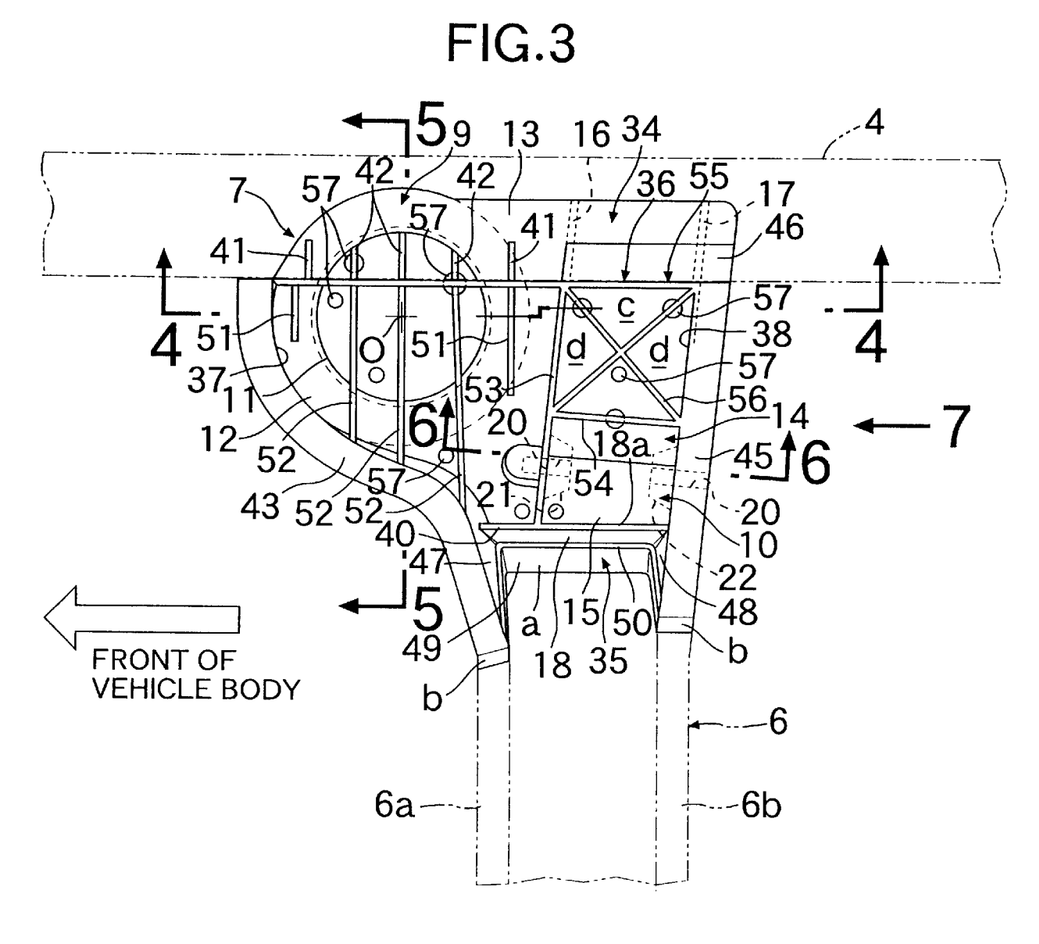
FIG. 3 is a plan view of the right suspension support member.
Figure 4:
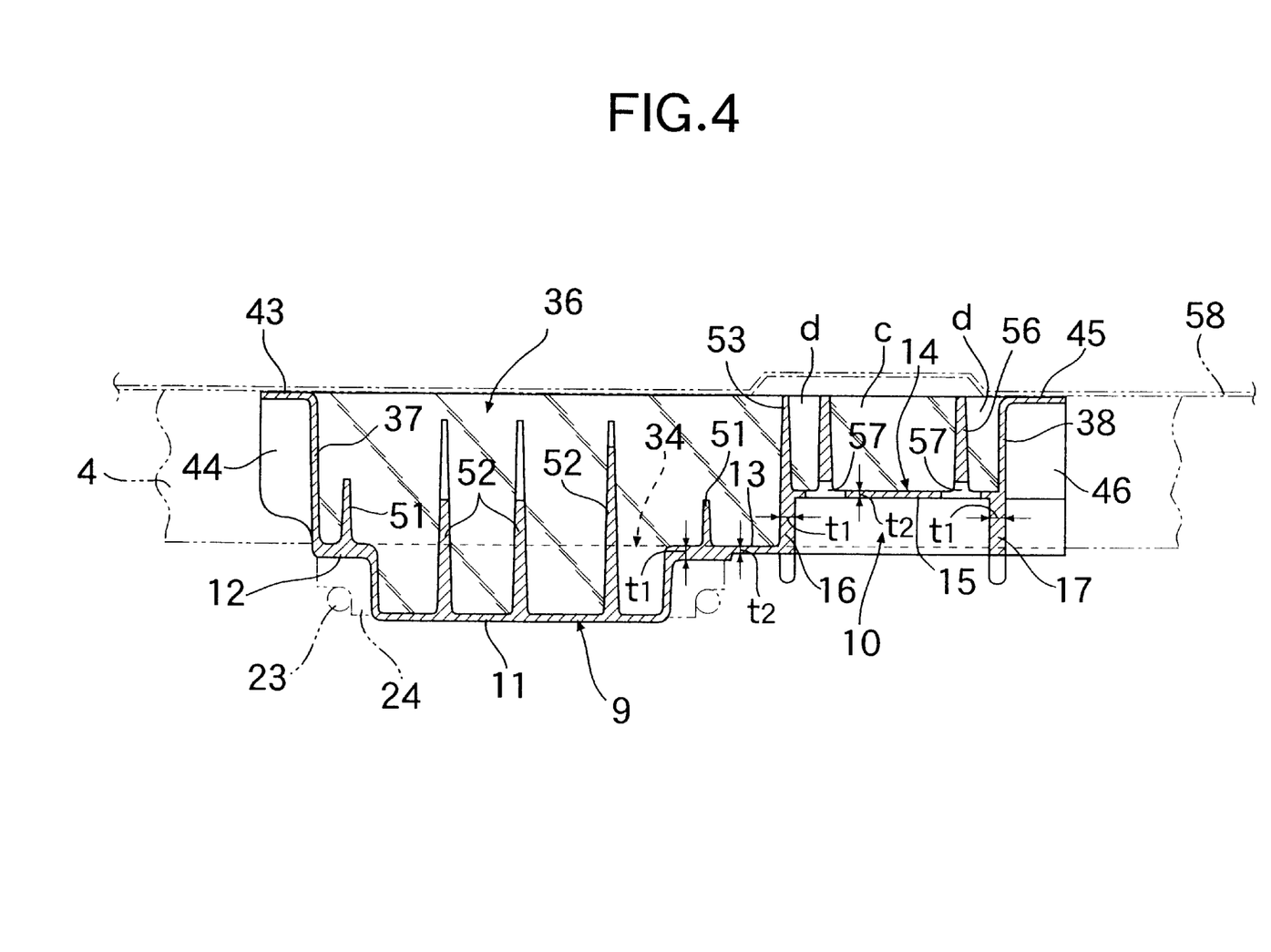
FIG. 4 is a sectional view taken along a line 4—4 in FIG. 3.
Figure 5:
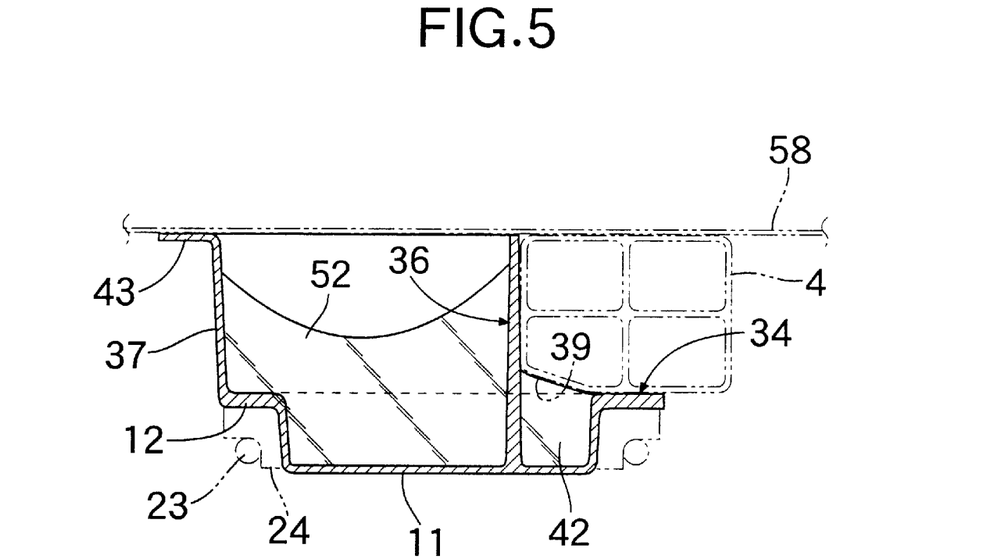
FIG. 5 is a sectional view taken along a line 5—5 in FIG. 3.
Figure 6:
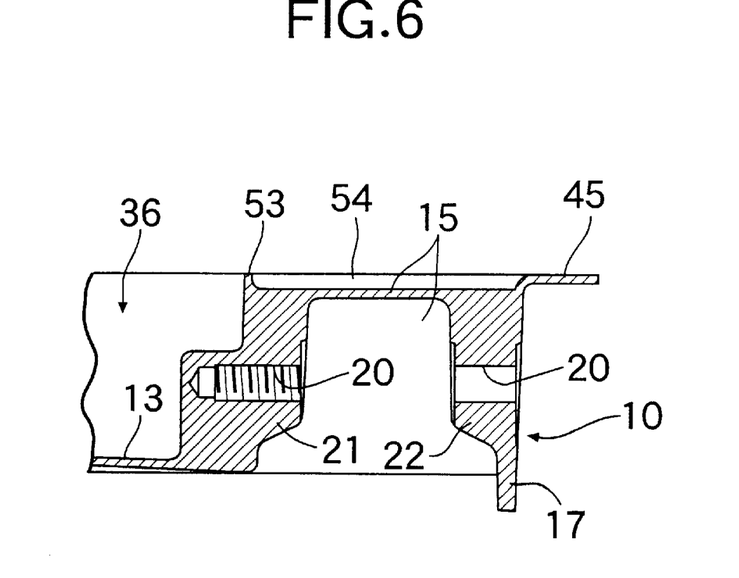
FIG. 6 is a sectional view taken along a line 6—6 in FIG. 3.
Figure 7:
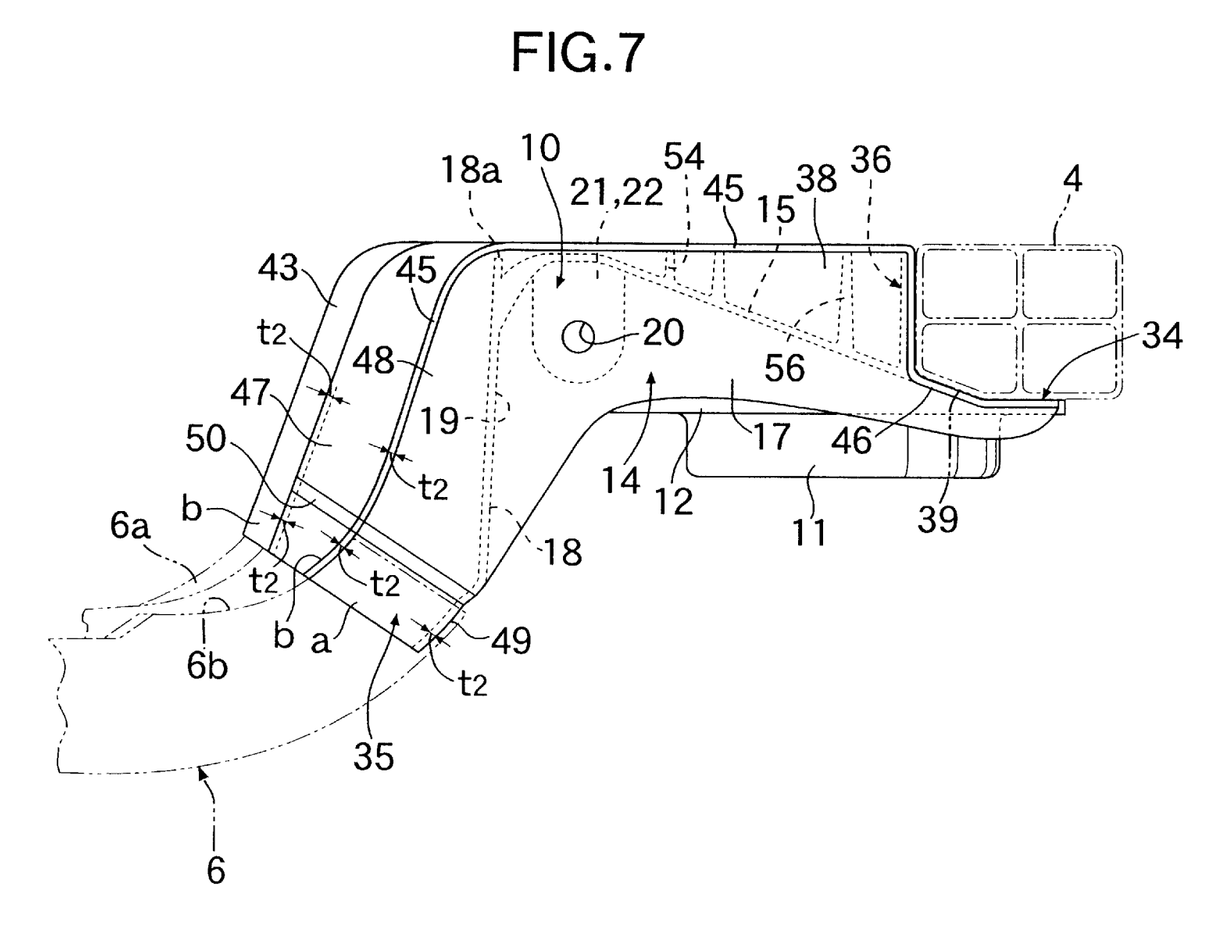
FIG. 7 is a view taken in the direction of an arrow 7 in FIG. 3.

The right suspension support member 7 includes a spring seat 9 for a coil spring at a front portion thereof, and a pivot support section 10 for a shock absorber at a rear portion, as also shown in FIG. 3. The spring seat 9 is comprised of a bottomed short cylindrical portion 11 which opens upwards, and an annular thick flange portion 12 connected to an open edge of the cylindrical portion 11, as also shown in FIGS. 4, 5 and 7. The pivot support section 10 is constructed in the following manner, as also shown in FIGS. 4, 6 and 7. A hood-shaped portion 14 is connected to the flange portion 11 of the spring seat 9 through an intermediate portion 13, and comprises a ceiling wall 15 declined from a central portion of the vehicle body toward the right side, front and rear walls 16 and 17 connected to the ceiling wall 15, and an end wall 18 connected to portions of the ceiling wall 15 and the front and rear walls 16 and 17 adjacent the central portion of the vehicle body. The end wall 18 has an upward protrusion 18a. The front wall 16 is connected to the intermediate portion 13, and a downward-facing recess 19 exists within the hood-shaped portion 14 and is increased in depth from the right side toward the end wall 18. Thick portions 21 and 22 each having an axial bore 20 are formed on the front and rear walls 16 and 17 in the deepest area of the recess 19, so that they are opposed to each other.

Figure 8:
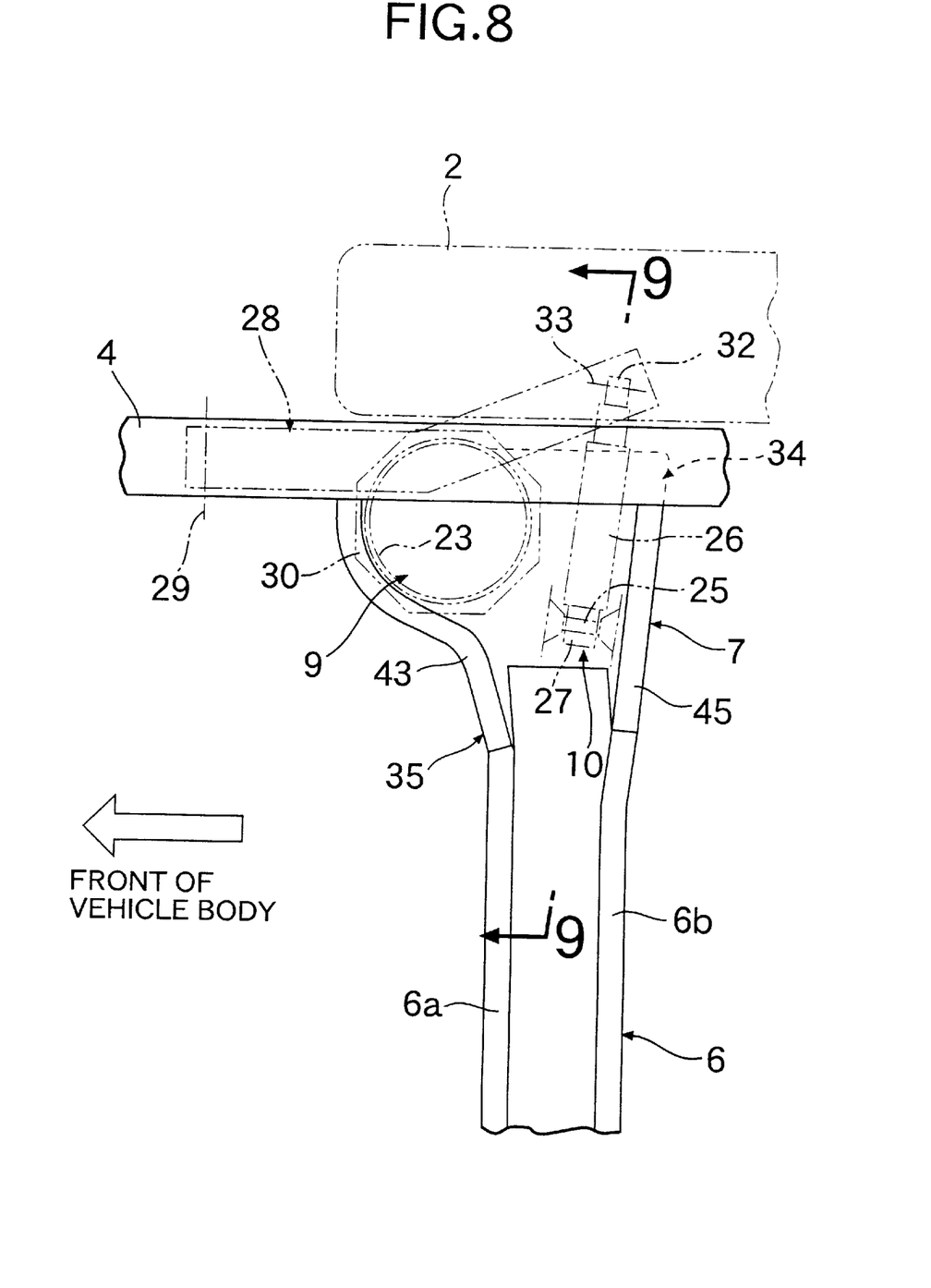
FIG. 8 is a schematic plan view showing a suspension for a right rear wheel.
Figure 9:
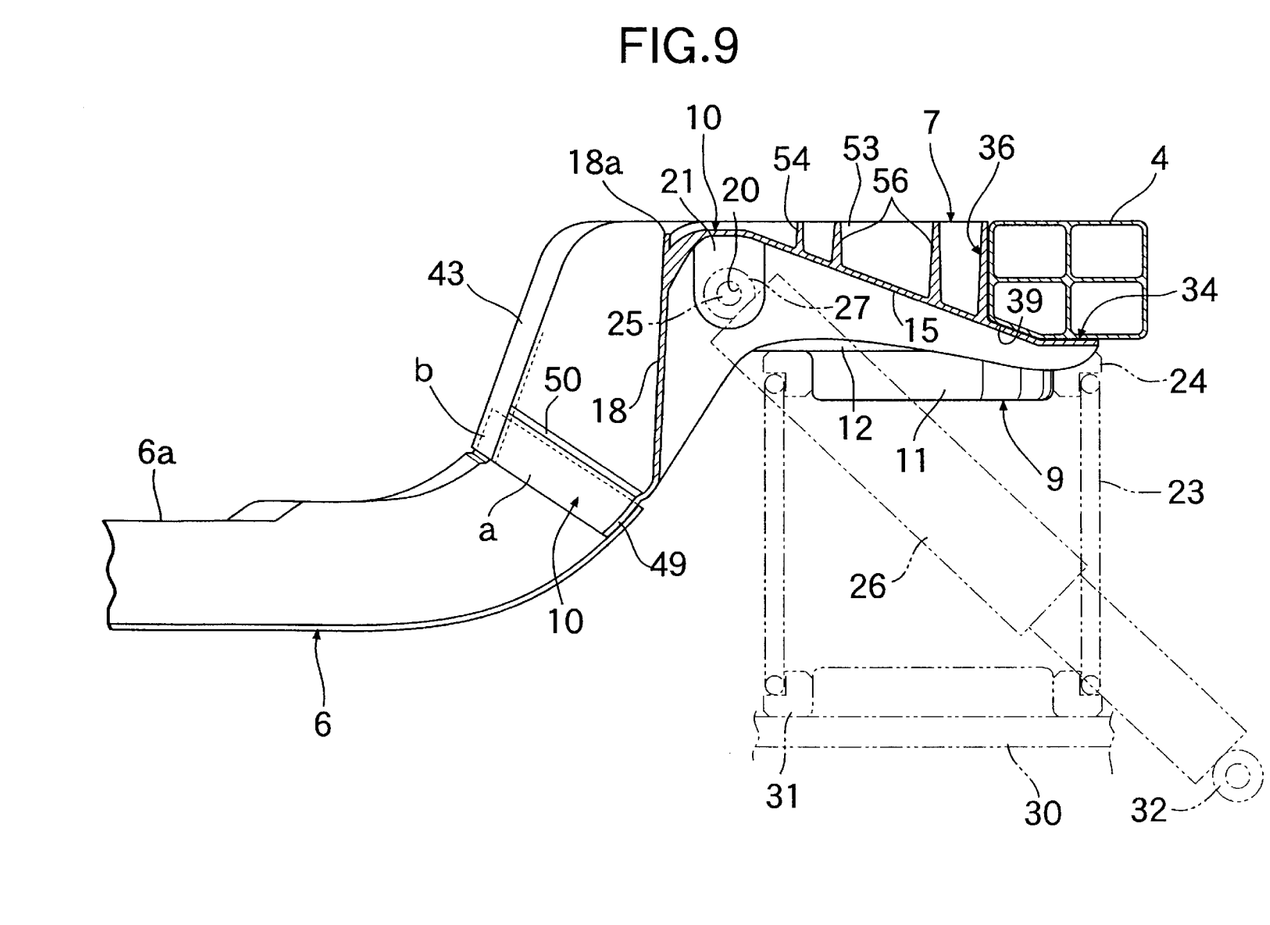
FIG. 9 is a sectional view taken along a line 9—9 in FIG. 8.

As also shown in FIGS. 8 and 9, the coil spring 23 is supported at its upper end on the spring seat 9 through a retainer 24 put in abutment against a lower surface of the flange portion 12, and an upper mounting ring 27 of a shock absorber 26 is supported in both the axial bores 20 in the pivot support section 10 through a pivot 25. An arm 28 is supported at its upper end on a lower surface of the right side member 4 through a pivot 29 and at its lower end on an axle which is not shown. A spring seat 30 is provided at an intermediate portion of the arm 28, and the coil spring 23 is supported at its lower end on the spring seat 30 through a retainer 31. A lower mounting ring 32 of the shock absorber 26 is supported at the lower end of the arm 28 through a pivot 33.

Since the right suspension support member 7 is formed of the cast article, as described above, the positions of the spring seat 9 for the coil spring and the pivot support section 10 for the shock absorber in the support member 7 are not moved. Therefore, if the right suspension support member 7 is disposed in a predetermined position on the vehicle body 1, both of the supported positions of the coil spring 23 and the shock absorber 26 can be determined simply with a good accuracy. In addition, the right suspension support member 7 made by casting has a high rigidity and moreover, has a vibration-damping property. Further, the spring seat 9 and the pivot support section 10 are disposed independently from each other and hence, a dispersion of a suspension input is provided. This is effective for ensuring the rigidity of the right suspension support member 7 and for enhancing the durability of the right suspension support member 7.

The right suspension support member 7 includes a plurality of components forming the vehicle body 1, e.g., first and second connecting sections 34 and 35 which connect the right side member 4 and the rear cross member 6 to each other in the illustrated embodiment. Thus, the right suspension support member 7 also functions as a coupling.

If the suspension support member 7 is constructed in this manner, a suspension input applied to the right suspension support member 7 can be dispersed with a good efficient to the right side member 4 and the rear cross member 6.

The first connecting section 34 for the right side member 4 is formed in the following manner: As shown in FIGS. 3 to 5, 7 and 9 (also see the left suspension support member 8 shown in FIG. 2), a partition wall 36 is provided between a front end of an upper surface of the spring seat 9 and a rear end of an upper surface of the pivot support section 10 to extend through a point slightly displaced rightwards from the center O of the bottomed short cylindrical portion 11 of the spring seat 9. The partition wall 36 is connected at its front end to one end of a front rising wall 37 connected to an outer peripheral edge of the flange portion 12, and at its rear end to a rear rising wall 38 connected to a rear edge of the ceiling wall 15 of the hood-shaped portion 14. The partition wall 36 is also connected at its lower edge to an upper surface of the flange portion 12, an inner peripheral surface and a bottom surface of the bottomed short cylindrical portion 11, an upper surface of the 15 intermediate portion 13, an outer surface of the front wall 16 of the hood-shaped portion 14 and an upper surface of the ceiling wall 14.

The partition wall 36, portions in the vicinity of the front and rear ends of the partition wall 36 and portions on the right of such portions, form the first connecting section 34 for conducting the welding with the right side member 4 placed on the first connecting section 34. As clearly shown in FIGS. 5, 7 and 9, an outer surface of a lower corner of the right side member 4 on the side of the partition wall 36 is formed into a slant 39 conforming to the ceiling wall 15. Therefore, upper end surfaces of two reinforcing ribs 42 as shown in FIGS. 2 and 3 connecting the partition wall 36 and the front and rear upper surface portions of the flange portion 12 together, as well as upper end surfaces of three reinforcing ribs 42 connecting the partition wall 36 and inner peripheral surfaces of the bottomed short cylindrical portion 11 together, are inclined, respectively. The other upper surface portions of the first connecting section 34 are flat.

The second connecting section 35 for the rear cross member 6 is constructed in the following manner: As shown in FIGS. 2 to 4, 7 and 9, the front rising wall 37 extends along the front outer peripheral edge of the flange portion 12 and the front edge of the intermediate portion 13 and beyond a front end of an extension 40 of the end wall 18 toward the central portion of the vehicle body. The front rising wall 37 has, at its upper end edge, a floor panel-mounting portion 43 which is bent forwards and is of a band-shape. The mounting portion 43 has a right extension 44 which lies on the same plane as the right side of the partition wall 36 and forms a portion of the first connecting section 34, as shown in FIG. 4. The rear rising wall 38 is integral with the rear wall 17 and extends toward the central portion of the vehicle body along the rear edge of the ceiling wall 15 and beyond the rear end of the end wall 18, so that it is opposed to the front rising wall 37. The rear rising wall 38 has, at its upper end edge, a floor panel-mounting portion 45 which is bent rearwards and which is band-shaped. The mounting portion 45 has a right extension 46 which extends along the rear end of the partition wall 36 and the rear edge of the ceiling wall 15 and which forms a portion of the first connecting section 34.

As clearly shown in FIGS. 3 and 7, the front and rear rising walls 37 and 38 have protrusions 47 and 48 which are provided at locations displaced from the end wall 18 toward the central portion of the vehicle body. Lower ends of the protrusions 47 and 48 extend from the end wall 18 and a lower edge of an extension 40 of the end wall 18, and are connected to an inclined wall 49 which is declined toward the central portion of the vehicle body. A U-shaped step 50 is formed at an upper edge of the inclined wall 49 and the protrusions 47 and 48 substantially in parallel with lower edges thereof.

An area a below the U-shaped step 50 at the inclined wall 49 and the protrusions 47 and 48 and an area b below phantom extensions of the U-shaped step 50 on both the mounting portions 43 and 45 form the second connecting section 35. As clearly shown in FIGS. 7 and 9, the right end of the rear cross member 6 is fitted into the second connecting section 35 from below the latter and welded to the second connecting section 35. In this case, the first connecting section 34 and the right side member 4 as well as the second connecting section 35 and the rear cross member 6 have small positioning projections and small recesses (including small bores) provided relatively thereon, so that the projections are fitted into the recesses, thereby enabling the simplification of a welding jig.

The right suspension support member 7 has a plurality of reinforcing ribs, so that it can oppose a suspension input applied to the spring seat 9 and the pivot support section 10. Thus, the spring seat 9 and the pivot support section 10 receive a suspension input as an in-plane stress and hence, it is possible to reduce the weight of the right suspension support member 7.

As shown in FIGS. 3 to 5, the spring seat 9 is provided, on the left of the partition wall 36, with (1) two reinforcing ribs 51 which connect front and rear upper surface portions of the flange 12 and the partition wall 36 together, and (2) three reinforcing ribs 52 which exist between the reinforcing ribs 51 and extend within the bottomed short cylindrical portion 11 to connect the partition wall 36 and the front rising wall 37 to each other. In addition, the above-described five reinforcing ribs 41 and 42 provided on the first connecting section 34 are added. A substantially front half of the partition wall 36 also functions as a reinforcing rib.

As shown in FIGS. 2 to 4, 7 and 9, the pivot support section 10 is provided with (1) a reinforcing rib 53 which extends along the front edge of the ceiling wall 15 and which connects the partition wall 36 and the upward protrusion 18a of the end wall 18 to each other, (2) a reinforcing rib 54 which connects an intermediate portion of the reinforcing rib 53 and an intermediate portion of the rear rising wall 38 to each other, and (3) X-shaped reinforcing ribs 56 which are disposed on both of diagonal lines within a quadrilateral frame-shaped section 55 including the partition wall 36 and each of which connects opposed corners to each other. In this case, a substantially rear half of the partition wall 36, the rear rising wall 38 and the upward protrusion 18a of the end wall 18 also function as reinforcing ribs.

The bottom wall of the bottomed short cylindrical portion 11, the intermediate portion 13 and the ceiling wall 15 are provided with drain bores 57 for removing water entering into a space surrounded by reinforcing ribs and the like. In this case, as clearly shown in FIGS. 3 and 4, to conduct the removal of water, for example, in two divisions c and d in the ceiling wall 15 by one of the drain bores 57, the drain bores 57 reaching the two divisions c and d are formed, so that they are passed through the ceiling wall 15 to eat into base ends of the X-shaped reinforcing ribs 56. If such means is used, it is possible to reduce the number of boring steps.

A floor panel 58 made of an Al alloy is attached to both of the mounting portions 43 and 45 of the right suspension support member 7, as shown in FIGS. 4 and 5, whereby the member 7 is brought into a closed-section structure and hence, the torsional rigidity of the section of the member 7 is enhanced.

As shown in FIGS. 4 and 7, the flange 12 of the spring seat 9 and the front and rear walls 16 and 17 of the pivot support section 10 have a thickness $t_1$ which is larger than a thickness $t_2$ of the intermediate portion 13 and the ceiling wall 15 of the first connecting section 34, the areas a and b of the second connecting section 35 and the floor panel-mounting portions 43 and 45. Thus, the stress applied to the right suspension support member 7 by the suspension input can be substantially uniformized over the entire member 7, and hence, the durability of the member 7 can be enhanced.

In addition, it is possible to eliminate or reduce the difference in thickness between the intermediate portion 13 and the ceiling wall of the first connecting section 34 and the right side member 4, the difference in thickness between the areas a and b of the second connecting section 35 and the rear cross member 6, and the difference in thickness between the mounting portions 43, 45 and the floor panel 58, thereby enhancing the welding properties of them.

The left suspension support member 8 has a structure similar to that of the right suspension support member 8, mainly, except that the shapes of the front rising wall 37 and the floor panel-mounting portion 43 and the partition wall 36 integral with the front rising wall 37 are different from those in the right suspension support member 7, as shown in FIGS. 1 and 2. Therefore, components or portions of the left suspension support member 8 corresponding to those of the right suspension support member 7 are designated by like reference characters, and the detailed description of them is omitted.

What is claimed is:

1. A suspension system for a vehicle body comprising:

a coil spring;

a shock absorber, the coil spring and the shock absorber forming a suspension, wherein said suspension support member is formed on a cast article and has a generally U-shaped cross-sectional configuration having a base wall and a pair of side walls;

a spring seat, the spring seat sized to project centrally into and internally of said coil spring, wherein the spring seat includes an annular flange portion connected to an open edge of a cylindrical portion; and a pivot support section for said shock absorber, said spring seat and said pivot support section being disposed independently from each other and being formed into the base wall between the pair of side walls.

2. A suspension system according to claim 1, further including a plurality of reinforcing ribs so as to be able to oppose a suspension input applied to said spring seat and said pivot support section.

3. A suspension system according to claim 1, wherein reinforcing ribs are projected to extend across and connect an inside of said cylindrical portion on a side of the spring seat opposite to that side of the spring seat carrying said coil spring.

4. A suspension support member for a vehicle, mounted on a vehicle body (1) to support a coil spring (23) and a shock absorber (26) forming a suspension, wherein said suspension support member is formed of a cast article including a spring seat (9) for said coil spring, a pivot support section (10) for said shock absorber, and a plurality of connecting sections (34 and 35) provided to function as couplings for connecting a plurality of components (4 to 6) forming the vehicle body (1) to one another, said spring seat and said pivot support section being disposed independently from each other.

5. A suspension support member for a vehicle, mounted on a vehicle body (1) to support a coil spring (23) and a shock absorber (26) forming a suspension, wherein said suspension support member is formed of a cast article including a spring seat (9) for said coil spring, a pivot support section (10) for said shock absorber, a plurality of reinforcing ribs (41, 42, 51 to 53 and 56) so as to be able to oppose a suspension input applied to said spring seat (9) and said pivot support section (10), and a plurality of connecting sections (34 and 35) provided to function as couplings for connecting a plurality of components (4 to 6) forming the vehicle body (1) to one another, said spring seat and said pivot support section being disposed independently from each other.

6. A suspension support member for a vehicle according to claim 1 or 2, further including a plurality of connecting sections (34 and 35) provided to function as couplings for connecting a plurality of components (4 to 6) forming the vehicle body (1) to one another.

* * * * *